United States Patent [19]

Dey et al.

[11] 4,264,687

[45] Apr. 28, 1981

[54] FLUID DEPOLARIZED CELL

[75] Inventors: Arabinda N. Dey, Needham, Mass.; William L. Bowden, Nashua, N.H.

[73] Assignee: Duracell International Inc., Bethel, Conn.

[21] Appl. No.: 78,120

[22] Filed: Sep. 24, 1979

[51] Int. Cl.$^3$ .............................................. H01M 10/39
[52] U.S. Cl. ..................................... 429/101; 429/196; 429/232
[58] Field of Search .......................... 429/101, 196, 232

[56] References Cited

U.S. PATENT DOCUMENTS

| | | | |
|---|---|---|---|
| 3,926,669 | 12/1975 | Auborn | 429/196 |
| 4,012,564 | 3/1977 | Auborn | 429/196 |
| 4,150,198 | 4/1979 | Domeniconi | 429/196 |
| 4,167,608 | 9/1979 | Giattino | 429/196 |
| 4,170,693 | 10/1979 | Catanzarite | 429/101 |

Primary Examiner—Donald L. Walton
Attorney, Agent, or Firm—Ronald S. Cornell; Israel Nissenbaum; Martin M. Glazer

[57] ABSTRACT

A fluid depolarized cell containing an inert cathode with finely divided metal powder dispersed within said cathode. The metal powder such as nickel powder catalyzes the reaction of unstable decomposition products of the fluid depolarizer into more stable species. Cell safety and discharge capability are enhanced with reduced cathode passivation.

13 Claims, No Drawings

FLUID DEPOLARIZED CELL

This invention relates to cathodes for fluid depolarized cells and more particularly to non-aqueous electrolyte cells containing thionyl chloride ($SOCl_2$) cathode depolarizers.

One of the highest energy density electrochemical cell systems discovered is one in which the cathode depolarizer is in fluid form and which reacts during cell discharge on an inert, generally carbonaceous cathode. Examples of the most common of such fluid depolarizers include sulfur dioxide ($SO_2$) and thionyl chloride ($SOCl_2$). Such depolarizers, for maximum energy density, are coupled in cells with active metal (metals above hydrogen in the EMF series) anodes such as lithium, sodium, potassium, magnesium and calcium. These cells, while having high energy densities, voltages and discharge capabilities, particularly when utilized with lithium anodes are however subject to several severe drawbacks. Foremost among such drawbacks, particularly with cells containing $SOCl_2$ depolarizers is that of safety, wherein when such cells are abused such as by cell shorting or by forced discharge or cell reversal, the cells have a tendency to unpredictably explode. In order to prevent such explosive consequences, reduction in electrolyte conductivity has been proposed but reduction of the conductivity, while ameliorating explosive cell conditions, nevertheless results in reduced cell capability.

It is an object of the present invention to provide a fluid depolarized cell, particularly one containing $SOCl_2$, which is both abuse resistant and capable of supplying high rate and full cell capability.

It is a further object of the present invention to provide such high rate abuse resistant cells wherein the cell has a greater rate capability than prior art non abuse resistant cells.

These and other objects, features and advantages of the present invention will become more evident from the following discussion.

Generally the present invention comprises a fluid depolarized cell with an inert cathode having metal powder dispersed therein. The metal powder comprises all (with suitable binder) or part of the inert cathode and preferably comprises 1%-60% by weight of the cathode. A cathode having amounts of metal powder above 60% generally requires additional binders for structural integrity thereby reducing capacity of the cathode. Such greater amounts while operable in accordance with the present invention are less preferred.

The particular metals used for the metal powders of the present invention are those metals which are compatible with cell components and which catalyze the reaction of unstable decomposition products of the fluid depolarizer which form at the inert cathode into more stable species. It is postulated that by minimizing the presence of such unstable decomposition products the safety of the cell is enhanced under various abuse conditions. The addition of the metal powders into the inert cathode additionally enhances the conductivity of the cathode above that of the carbonaceous material generally used as cathodes, whereby the rate capability of the cell is enhanced.

The most preferred metal for use in the metal powders of the present invention is nickel. Other conductivity enhancing, catalyzing metals include cobalt (Co), manganese (Mn), and chromium (Cr).

The metal powder, in order to provide enhanced conductivity and to have catalytic properties, generally has a particle size of less than about 12 mils and more preferably on the order of about 5 microns.

Though porous activated carbon or graphite such as Shawinigan carbon black is the generally preferred inert cathode material, metals have been used as cathodes in fluid depolarized cells such as in U.S. Pat. No. 3,926,669 issed to James J. Auborn. Such metals however are described as being "solid" indicating their use in the form of foils and the like. In such configuration they are generally incapable of providing the catalysis or enhanced conductivity of the present invention.

In U.K. Patent Application Ser. No. GB 2 003 651 published Mar. 14, 1979 there is described the utilization of copper as an additive to the cathode of a cell having a thionyl chloride, sulfuryl chloride or phosphoryl chloride cathode depolarizer. However, the copper additive as described functions as a reactive material rather than as a catalyst as in the present invention. As a result the properties of the metal powders of the present invention provide additional benefits not found with the copper additive described in the aforesaid U.K. Patent Application. Thus, for example, fluid depolarized cells are normally subject to voltage delay (time required for initial cell discharge). With the metal powders, such as nickel, of the present invention such cells are not as detrimentally affected by such voltage delays as cells having copper therein. Additionally, by functioning as catalysts, the metal powders of the present invention are substantially unreactive with reaction products in the cell and remain in their conductive metallic state throughout cell discharge without passivating the cathode to any great extent. However, the cathodes of the cells in the U.K. application, containing the reacting copper, tend to react with cell reaction products and in turn form non-conductive products such as copper sulfide on the cathode thereby increasingly passivating the cathode and reducing cell capability and cell life.

As an example of the catalysis of the present invention it is postulated that the cell reaction in a $Li/SOCl_2$ cell is:

$$2Li + SOCl_2 \rightarrow 2LiCl + SO$$

The "SO" reaction product is an unstable species and is therefore highly reactive whereby upon abusive conditions it may cause explosive or fire conditions. It is further postulated that the metal powder of the present invention catalyzes the SO into the following reaction:

$$2SO \xrightarrow{Ni} SO_2 + S$$

Both the $SO_2$ and the sulfur are relatively safer than the unstable SO thereby enhancing cell abuse resistance and safety of the cell.

The fluid depolarizers utilized in the cells of the present invention include the aforementioned thionyl chloride and sulfur dioxide and other fluid oxyhalides, non-metallic oxides, non-metallic halides and mixtures thereof such as phosphorous oxychloride ($POCl_3$), selenium oxychloride ($SeOCl_2$), sulfur trioxide ($SO_3$), vanadium oxytrichloride ($VOCl_3$), chromyl chloride ($CrO_2Cl_2$), sulfuric oxychloride ($SO_2Cl_2$), nitryl chloride ($NO_2Cl$), nitrosyl chloride (NOCl), nitrogen dioxide ($NO_2$), sulfur monochloride ($S_2Cl_2$) and sulfur monobromide ($S_2Br_2$). Each of the above can be used together with thionyl chloride ($SOCl_2$) as a fluid cathode depolarizer or separately. The fluid cathode depolarizers may also function as electrolyte solvents or may be used in cells having other non-aqueous solvents such as organic solvents including propylene carbonate, acetonitrile, methyl formate, tetrahydrofuran and the like which have generally been used in non-aqueous high energy density lithium and lithium/$SO_2$ cells.

In addition to the metal powder and carbonaceous material the cathodes generally require a binder to hold the powders together as a unitary structure. Such binders are substantially inert and generally comprise polymeric materials with the most commonly utilized being polytetrafluoroethylene (PTFE). Binders generally comprise about 5-10% by weight of a powdered cathode.

Preferably the electrolyte salt or salts used in the cell of the present invention should provide a conductivity in excess of $10^{-2}$ ohm$^{-1}$ cm$^{-1}$ at room temperature. Examples of electrolyte salts having the requisite conductivities and compatability commonly used in cells containing fluid depolarizer include alkali and alkaline earth metal halides, tetrahaloaluminates, tetrahaloborates, clovoborates, hexafluorophosphates, hexafluoroarsenates, perchlorates and other electrolyte salts or solutes enumerated in patents such as U.S. Pat. Nos. 3,926,669 and 4,020,240.

The following examples exemplify the utility and efficacy of the present invention as compared to that of the prior art. Such examples are however for illustrative purposes only and details contained therein should not be considered as limitations on the present invention. Unless otherwise indicated all parts are parts by weight.

EXAMPLE I (PRIOR ART)

Two "D" size convolutely wound cells are placed in parallel with each of the cells having a lithium anode, a thionyl chloride cathode depolarizer and a carbon cathode. The lithium anode has the dimensions 26"×1.875"×0.012" (66.04 cm×4.76 cm×0.03 cm) and the carbon cathode has the dimensions 25"×1.75"×0.013" (63.5 cm×4.44 cm×0.33 cm) and is comprised of 90% Shawinigan carbon black and 10% PTFE as binder on an expanded nickel grid. The electrolytes is ~49 gms of a 1.8 M $LiAlCl_4$ in $SOCl_2$ solution. The parallel cells are repeatedly pulse discharged at 17.5 amperes for 35.5 milliseconds and then at 1.8 amperes for 14.5 milliseconds for three minutes with the cycle repeated after 27 minutes. The cells polarize at the 17th cycle. After discharge the cells are forced into reversal of a rate of 2 amperes (1 ampere per cell). The cells explode at zero volts.

EXAMPLE 2

Two "D" size cells are constructed and connected in parallel as in Example 1 but with the cathodes being comprised of 35% Ni powder (5 micron spherical) 10% PTFE and 55% carbon. The cells are cycled as in Example 1 and polarize after 22 cycles. After discharge the cells are forced into reversal at a rate of 2 amperes (1 ampere per cell) for 16 hours at which time reversal is stopped. There are no untoward effects of such reversal.

EXAMPLE 3

Two "D" size cells are constructed and put in parallel as in Example 1 but with cathodes having 55% Ni powder, 10% PTFE binder and 35% carbon. The cells are cycled as in Example 1 and polarize after 19 cycles. After discharge the cells are forced into reversal as in Examples 1 and 2 for 19 hours with no untoward effects.

EXAMPLE 4

Two "D" size cells are constructed and put in parallel as in Example 2 but with cathodes having 30% Co powder, 10% PTFE and 60% carbon. The cells are cycled as in the previous examples and polarize after 19 cycles. Upon reversal as in the foregoing examples for 16 hours there are no untoward effects.

EXAMPLE 5 (PRIOR ART)

Parallel cells as in the preceding examples having cathodes with 10% Cu powder, 10% PTFE and 80% carbon when similarly cycled polarize at 17 cycles.

EXAMPLE 6 (PRIOR ART)

Parallel cells as in the preceding examples having cathodes with 50% Cu powder, 10% PTFE and 40% carbon polarize after 24 cycles but the load voltage is reduced to 2.2-2.4 volts. The load voltage of the cells in Example 2-4 is 2.8 volts. It is believed that the voltage reduction of the cell of Example 6 is caused by the internal resistance engendered by the build up of copper reaction products during discharge. The absence of a voltage drop in the cells having nickel or cobalt powder containing cathodes tends to indicate their catalytic function.

It is understood that the above examples are for illustrative purposes only and that modification of cell components and construction are within the scope of the present invention as defined in the following claims.

What is claimed is:

1. A high rate electrochemical cell comprising an active metal anode, a fluid cathode depolarizer and an inert cathode characterized in that said inert cathode contains a conductive metal powder dispersed therein with said metal being substantially unreactive with reaction products of said cathode depolarizer and wherein said metal is capable of catalyzing reaction of any unstable reaction products of said cathode depolarizer into more stable species.

2. The cell of claim 1 wherein said metal of said metal powder is selected from the group consisting of nickel, cobalt, chromium, and manganese.

3. The cell of claim 2 wherein said metal comprises nickel.

4. The cell of claim 1 wherein said metal powder comprises between 1-60% by weight of said inert cathode.

5. The cell of claim 1 wherein said metal powder has a particle size no more than 12 mils.

6. The cell of claim 5 wherein said metal powder has a particle size of about 5 microns.

7. The cell of claim 1 wherein said fluid cathode depolarizer is selected from the group consisting of fluid oxyhalides, non-metallic oxides, non-metallic halide and mixtures thereof.

8. An abuse resistant electrochemical cell comprising an active metal anode, a fluid thionyl chloride cathode depolarizer and an inert cathode characterized in that said inert cathode contains metal powder dispersed therein with said metal being substantially unreactive with reaction products of said cathode depolarizer and wherein said metal catalyzes reaction of unstable reaction products of said cathode depolarizer into more stable species.

9. The cell of claim 14 wherein said active metal anode is comprised of lithium.

10. An abuse resistant electrochemical cell comprising a lithium anode, a thionyl chloride cathode depolarizer, and an inert carbonaceous cathode characterized in that said inert cathode contains nickel powder dispersed therein.

11. The cell of claim 10 wherein said nickel powder comprises between 1–60% by weight of said inert cathode.

12. An abuse resistant electrochemical cell comprising an active metal anode, a thionyl chloride cathode depolarizer and an inert cathode characterized in that said inert cathode contains a metal powder dispersed therein with said metal of said metal powder selected from the group consisting of nickel, cobalt, chromium, and manganese.

13. The cell of claim 12 wherein said active metal anode is comprised of lithium.

* * * * *